United States Patent
Puppi et al.

(10) Patent No.: US 10,926,499 B2
(45) Date of Patent: Feb. 23, 2021

(54) PROCESS AND APPARATUS FOR AUTOMATICALLY APPLYING A NOISE REDUCING ELEMENT TO A TYRE FOR VEHICLE WHEELS

(71) Applicant: PIRELLI TYRE S.P.A., Milan (IT)

(72) Inventors: Cristiano Puppi, Milan (IT); Maurizio Marchini, Milan (IT); Albert Berenguer, Milan (IT); Ivan Gildo Boscaino, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 443 days.

(21) Appl. No.: 15/519,115

(22) PCT Filed: Oct. 27, 2015

(86) PCT No.: PCT/IB2015/058267
§ 371 (c)(1),
(2) Date: Apr. 13, 2017

(87) PCT Pub. No.: WO2016/067192
PCT Pub. Date: May 6, 2016

(65) Prior Publication Data
US 2017/0225417 A1     Aug. 10, 2017

(30) Foreign Application Priority Data

Oct. 29, 2014 (IT) .......................... MI2014A001857

(51) Int. Cl.
*B29D 30/00* (2006.01)
*B60C 19/00* (2006.01)

(52) U.S. Cl.
CPC ......... *B29D 30/0061* (2013.01); *B29D 30/00* (2013.01); *B29D 30/0016* (2013.01);
(Continued)

(58) Field of Classification Search
CPC .... B29D 30/00; B29D 30/0061; B29D 30/06; B29D 30/0685; B29D 30/16; B29D 30/30;
(Continued)

(56) References Cited

U.S. PATENT DOCUMENTS 4,824,349 A * 4/1989 Oku .................. B29D 30/0016
198/349
5,167,751 A   12/1992 Shimizu et al.
(Continued)

FOREIGN PATENT DOCUMENTS

CN    1458883 A    11/2003
DE    2740609 A1    6/2014
(Continued)

OTHER PUBLICATIONS

Northwestern, Propulsion, p. 1. (Year: 2013).*
(Continued)

*Primary Examiner* — Katelyn B Whatley
*Assistant Examiner* — Sedef E Paquette
(74) *Attorney, Agent, or Firm* — Steinfl + Bruno LLP (57) ABSTRACT

A process and an apparatus for automatically applying a noise reducing element to a tyre for vehicle wheels. The process includes: a) providing a noise reducing element; b) providing an adhesive material; c) guiding the noise reducing element according to a predetermined direction; d) during the guiding, applying the adhesive material onto a first surface of the noise reducing element; e) manipulating the noise reducing element by interacting with at least one second surface of the noise reducing element different from the first surface on which the adhesive material has been applied; and f) positioning the noise reducing element in a
(Continued)

predetermined position on a radially inner surface of the tyre, bringing the first surface into contact with the radially inner surface.

37 Claims, 6 Drawing Sheets

(52) U.S. Cl.
CPC .... *B60C 19/002* (2013.01); *B29D 2030/0038* (2013.01); *B29D 2030/0072* (2013.01)

(58) Field of Classification Search
CPC .... B29D 2030/0038; B29D 2030/0072; B29D 2030/0637; B29D 2030/0686; B29D 2030/0694; B29D 2030/0695; B29D 2030/2671; B29D 2030/2692; B29D 2030/4493; B29D 2030/2685; B29D 2030/4487; B60C 19/00; B60C 19/002; B60C 19/122
USPC ............ 156/115, 117, 394.1, 397; 152/209.2
See application file for complete search history.

(56) References Cited

U.S. PATENT DOCUMENTS

| | | | | |
|---|---|---|---|---|
| 5,169,482 | A * | 12/1992 | Bottcher | B29D 30/3007 156/123 |
| 5,582,664 | A * | 12/1996 | Sergel | B29D 30/3007 156/130 |
| 5,626,706 | A * | 5/1997 | Akiyama | B29D 30/3007 156/324 |
| 5,915,611 | A | 6/1999 | Baldoni et al. | |
| 2003/0019725 | A1 | 1/2003 | Hoffmann | |
| 2003/0150544 | A1 | 8/2003 | Naito et al. | |
| 2006/0144896 | A1 * | 7/2006 | Tubb | B60C 23/0408 227/150 |
| 2009/0293267 | A1 * | 12/2009 | Slots | B29D 30/3007 29/802 |
| 2011/0308706 | A1 * | 12/2011 | Sandstrom | B29D 30/0061 156/123 |
| 2012/0279828 | A1 | 11/2012 | Eschlbeck | |
| 2013/0248071 | A1 * | 9/2013 | Tanno | B29D 30/0061 152/450 |
| 2014/0144574 | A1 * | 5/2014 | Portinari | B29D 30/005 156/110.1 |
| 2015/0273944 | A1 * | 10/2015 | Yukawa | B29D 30/0685 152/510 |
| 2015/0328853 | A1 | 11/2015 | Denavit | |
| 2016/0263847 | A1 * | 9/2016 | Janszen | B29D 30/44 |
| 2020/0047564 | A1 | 2/2020 | Boscaino et al. | |

FOREIGN PATENT DOCUMENTS

| | | | |
|---|---|---|---|
| EP | 1251092 A2 | 10/2002 | |
| EP | 1800911 A2 | 6/2007 | |
| EP | 2239152 A1 | 10/2010 | |
| EP | 2660037 A1 | 11/2013 | |
| EP | 2660075 A1 | 11/2013 | |
| EP | 2746034 A1 | 6/2014 | |
| GB | 1421679 A * | 1/1976 | ............ B29D 30/52 |
| JP | S6322632 A | 1/1988 | |
| JP | 2006130735 A | 5/2006 | |
| JP | 2009160762 A | 7/2009 | |
| JP | 2011020479 A | 2/2011 | |
| KR | 20100043653 A | 4/2010 | |
| WO | WO-2013011396 A1 * | 1/2013 | ........... B29D 30/005 |
| WO | 2013061233 A1 | 5/2013 | |
| WO | 2014090983 A1 | 6/2014 | |
| WO | 2018/096458 A1 | 5/2018 | |

OTHER PUBLICATIONS

International Search Report and Written Opinion for PCT/IB2015/058267 filed Oct. 27, 2015 on behalf of Pirelli Tyre S.P.A. dated Mar. 18, 2016. 10 pages.
International Search Report for International Application No. PCT/IB2017/057318 filed Nov. 22, 2017 on behalf of Pirelli Tyre S.P.A. dated Mar. 21, 2018. 4 pages. (English Only).
Written Opinion for International Application No. PCT/IB2017/057318 filed Nov. 22, 2017 on behalf of Pirelli Tyre S.P.A. dated Mar. 21, 2018. 6 pages (English Only).
Chinese First Office Action for Chinese Application No. 201580057269.6 filed Oct. 27, 2015 on behalf of Pirelli Tyre S.P.A. dated Oct. 16, 2018. 10 pages (English Translation + Chinese Original).
Communication pursuant to Article 94(3) EPC for EP Application No. 15825812.9. dated May 29, 2020. 4 pages.
Second Office Action for CN Application No. 201580057269.6 for Pirelli Tyre S.P.A. with English translation. dated Jul. 17, 2019. 6 Pages.

* cited by examiner

PROCESS AND APPARATUS FOR AUTOMATICALLY APPLYING A NOISE REDUCING ELEMENT TO A TYRE FOR VEHICLE WHEELS

CROSS-REFERENCE TO RELATED APPLICATIONS

The present application is the U.S. national stage of International Patent Application PCT/IB2015/058267 filed on Oct. 27, 2015 which, in turn, claims priority to Italian application MI2014A001857 filed on Oct. 29, 2014.

The present invention relates to a process and an apparatus for automatically applying a noise reducing element to a tyre for vehicle wheels.

The term "automatic" is used to indicate an operation carried out by mechanical devices, without the need for manual intervention by an operator. The expression "mechanical devices" is used to indicate devices that are entirely mechanical, electro-mechanical, hydraulic, pneumatic, possibly controlled by suitable software.

The expression "noise reducing element" is used to indicate an element that, once associated to a tyre for vehicle wheels, has the capability to attenuate the noise produced by the tyre during use. Such a capability is preferably provided to the aforementioned element by the type of material from which the aforementioned element is made. A material suitable for such a purpose is for example a sound-absorbent material, such as open-cell foamed polyurethane.

The term "elastomeric" is used to refer to a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The terms "radial" and "axial" and the expressions "radially inner/outer" and "axially inner/outer" are used with reference to the radial direction of the tyre (i.e. to a direction perpendicular to the rotation axis of the tyre) and to the axial direction of the tyre (i.e. to a direction parallel to the rotation axis of the tyre). The terms "circumferential" and "circumferentially", on the other hand, are used with reference to the annular extension of the tyre.

The expression "feeding direction" is used to indicate a direction parallel to the longitudinal direction of at least one conveyor belt. The feeding direction thus corresponds to the direction of forward movement of the conveyor belt.

The expressions "low", "under", "lower" or "below", and "high", "over", "upper" or "above" are used to indicate a relative position with respect to the aforementioned at least one conveyor belt.

The expressions "downstream"/"head" and "upstream"/"tail" are used with reference to the aforementioned feeding direction. Therefore, assuming for example a feeding direction from left to right, a "downstream" or "head" position with respect to any reference element indicates a position to the right of said reference element and an "upstream" or "tail" position indicates a position to the left of said reference element.

The expression "close proximity" is used to indicate a positioning with mutual contact between two adjacent noise reducing elements or with an absolutely negligible distance apart with respect to the longitudinal extension of the same noise reducing elements.

A tyre for vehicle wheels generally comprises a carcass structure comprising at least one carcass ply formed of reinforcing cords incorporated in a matrix of elastomeric material. The carcass ply has end edges respectively engaged with annular anchoring structures. The latter are arranged in the areas of the tyre usually identified with the name "beads" and each of them is normally formed by a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre from coming out from such a seat.

Specific reinforcing structures having the function of improving the torque transmission to the tyre can be provided at the beads.

A crown structure is associated in a radially outer position with respect to the carcass structure.

The crown structure comprises a belt structure and, in a radially outer position with respect to the belt structure, a tread band made of elastomeric material.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

A so-called "under-layer" made of elastomeric material can be arranged between the tread band and the belt structure, the under-layer having properties suitable for ensuring a steady union of the tread band to the belt structure.

Respective sidewalls of elastomeric material are applied on the side surfaces of the carcass structure, each extending from one of the side edges of the tread band up to the respective annular anchoring structure to the beads.

EP 1800911 illustrates a tyre with a noise reducing element comprising a structure made of foamed material arranged in a radially inner position with respect to the carcass, such a structure made of foamed material including a vulcanized foamed rubber composition having a density ranging from 0.1 g/cm$^3$ to 1 g/cm$^3$.

EP 2239152 illustrates a tyre with a noise reducer attached to the tyre cavity surface. The noise reducer is formed in a ring shape by butting in contact both end faces of an elongated sponge material disposed along the tyre circumferential.

EP 2660075 illustrates a tyre provided with a noise damper in the tyre cavity. The tyre comprises a tread having a width TW in contact with the ground during travel, wherein a noise damper made with a sound-absorbing material is attached to the internal surface of the tyre in order to reduce the cavity resonance. The noise damper is at least one continuous ribbon of sound-absorbing material having a width W and a thickness E, and fixed over an attachment width We to the tyre internal surface over a range of at least 30% of the inside of the tread in the radial direction. The start end and the terminal end of the continuous ribbon are disposed in such a way to be offset from each another in the axial direction, and the continuous band forms, together with the tyre internal surface, a continuous groove having a width D which is at least equal to 10% of the width W of the continuous ribbon.

EP 2660037 illustrates a method for producing a tyre in which, on the tyre internal surface, a noise reducing element is provided in the form of a continuous ribbon. The method comprises the following steps: providing a vulcanized tyre; mixing a composition suitable for forming the noise reducing element with an agent made of foamed material to produce a liquid composition; rotating the tyre and introducing the liquid composition on the tyre internal surface through a suitable device; varying the axial position of the tyre while the liquid composition is introduced and passes into a gel; drying and foaming the gelled liquid composition.

The Applicant has observed that such noise reducing elements generally consist of blocks of substantially parallelepiped shape made of foamed polymeric material (for example open cell foamed polyurethane) provided, on a face thereof, with a pressure-sensitive adhesive material covered by an anti-adhesive protective film, for example a film of paper or of a polymeric material, like polyethylene PE, polypropylene PP or polyethylene terephthalate PET, treated on the surface thereof with silicones. Each noise reducing element is glued manually in a predetermined position on the radially inner surface of the tyre by an operator after he/she has removed the aforementioned protective film, again manually.

The Applicant has observed that the manual process described above, precisely because it is manual, inevitably limits productivity.

The Applicant has also observed that the aforementioned manual process requires the operator to pay high attention both during the removal operation of the protective film and during the gluing operation on the tyre.

Indeed, according to the Applicant, in order to be able to adequately perform the function of noise attenuator of the rolling tyre and to ensure that this happens for a time as long as possible (hopefully equal to the useful life of the tyre), it is important both for the adhesive to remain well distributed over the face of the noise reducing element after the removal of the protective film, and for the entire adhesive face of the noise reducing element to be glued stably inside the tyre in a predetermined position in the circumferential and axial direction.

The Applicant believes that for this purpose it is necessary to avoid the hands of the operator accidentally making contact with the adhesive face of the noise reducing element during and/or after the removal of the protective film. This could indeed generate an undesired uneven distribution of the adhesive on the noise reducing element. It is also necessary to prevent the noise reducing element, once glued on the tyre, from being able to move during the rolling of the tyre. This could result in an undesired abrasion by friction of the noise reducing element, with consequent reduction of the time of the noise attenuation effect.

The Applicant has thus felt the need to automate the gluing process of noise reducing elements to tyres for vehicle wheels, so as to increase productivity and achieve the desired precision and repeatability of the gluing operations of the same noise reducing elements.

The Applicant has noted that, particularly in those cases in which the protective film has the same size as the size in plan of the noise reducing element, the automatic removal of the aforementioned protective film would be problematic due to the difficulty in creating the initial peeling for the detachment of the protective film from the face of the noise reducing element.

The Applicant has thus thought to a solution that does not require the presence on the noise reducing element of a protective film to be removed before gluing the noise reducing element on the tyre.

The Applicant has indeed observed that, in the absence of the aforementioned protective film, the operations of moving and gluing the noise reducing element could be totally automated, so as to avoid any manual intervention of the operator and achieve the aforementioned advantageous technical effects in terms of productivity and precision/repeatability.

The Applicant has perceived that such automation can be effectively obtained, starting from a noise reducing element without adhesive material and the relative protective film, by providing firstly an automated application of the adhesive material to the aforementioned noise reducing element and, thereafter, an automated transfer of such a noise reducing element, and of the adhesive material applied thereon, to the tyre for vehicle wheels.

Finally, the Applicant has found that the aforementioned automated application can take place by applying the adhesive material on a first surface of the noise reducing element while the latter is guided according to a predetermined direction, whereas the aforementioned automated transfer can take place by manipulating the noise reducing element at at least one second surface thereof different from the aforementioned first surface.

The present invention therefore relates, in a first aspect thereof, to a process for applying a noise reducing element to a tyre for vehicle wheels.

Preferably, a noise reducing element is provided.

Preferably, an adhesive material is provided.

Preferably, said noise reducing element is guided according to a predetermined direction.

Preferably, during said guiding said adhesive material is applied onto a first surface of said noise reducing element.

Preferably, said noise reducing element is manipulated by interacting with at least one second surface of said noise reducing element different from said first surface on which said adhesive material has been applied.

Preferably, said noise reducing element is positioned in a predetermined position on a radially inner surface of said tyre, bringing said first surface into contact with said radially inner surface.

The Applicant believes that the process described above allows achieving, in a totally automated manner, the application of a noise reducing element on the radially inner surface of a tyre for vehicle wheels without the need to previously remove any protective film of the layer of adhesive material from the aforementioned noise reducing element.

In a second aspect thereof, the present invention relates to an apparatus for applying a noise reducing element to a tyre for vehicle wheels.

Preferably, a distributor device for distributing noise reducing elements is provided.

Preferably, a supporting device for supporting an adhesive material is provided.

Preferably, a guiding device for guiding a noise reducing element according to a predetermined direction is provided.

Preferably, an applicator for applying said adhesive material on a first surface of said noise reducing element is provided.

Preferably, a manipulator of said noise reducing element is provided, the manipulator being configured to interact with a second surface of said noise reducing element different from said first surface and to position said noise reducing element in a predetermined position on a radially inner surface of said tyre, bringing said first surface into contact with said radially inner surface.

The Applicant believes that the aforementioned apparatus allows, starting from a noise reducing element without any adhesive material, the following technical effects:

the automated application of the adhesive material to the aforementioned noise reducing element;

the automated transfer of the aforementioned noise reducing element, and of the adhesive material adhered thereto, towards a tyre for vehicle wheels;

the automated application of such a noise reducing element on the radially inner surface of such a tyre.

The present invention, in at least one of the aforementioned aspects, can have at least one of the following preferred characteristics.

Preferably, the actions described above are repeated cyclically to cover a predetermined portion of said radially inner surface of said tyre with a plurality of noise reducing elements.

Preferably, guiding said noise reducing element according to said predetermined direction comprises arranging said noise reducing element on a first conveyor belt movable along a feeding direction and having, on an upper surface thereof, a continuous film supporting a layer of adhesive material.

Preferably, applying said adhesive material onto said first surface of said noise reducing element comprises pressing said noise reducing element against said first conveyor belt so that said noise reducing element adheres firmly to a portion of said layer of adhesive material.

Preferably, as a result of the movement of said first conveyor belt along said feeding direction, said noise reducing element is transferred to a second conveyor belt arranged downstream of said first conveyor belt, while holding said continuous film at said first conveyor belt.

Preferably, said portion of said layer of adhesive material is detached from the layer of adhesive material arranged on said first conveyor belt when said noise reducing element has left said first conveyor belt.

Preferably, manipulating said noise reducing element comprises picking up said noise reducing element, without said layer of adhesive material, from said second conveyor belt and moving it towards said tyre for vehicle wheels.

The application of the adhesive material to the noise reducing element thus preferably takes place, in a totally automated manner, by picking up the aforementioned layer of adhesive material from a continuous film associated with the aforementioned first conveyor belt and holding such a continuous film at the first conveyor belt when the noise reducing element is transferred to the aforementioned second conveyor belt to then be picked up and glued onto the tyre.

Preferably, arranging said noise reducing element on said first conveyor belt comprises:

picking up said noise reducing element from a feeding belt or a storage device arranged upstream of said first conveyor belt.

Preferably, arranging said noise reducing element on said first conveyor belt comprises:

positioning said noise reducing element on said first conveyor belt.

In this way, the initial operations of the process can be automated as well.

Preferably, picking up said noise reducing element comprises exerting a suction force on said noise reducing element. Such a provision makes it possible to effectively pick up and move the noise reducing element without subjecting it to mechanical stresses that could damage it.

The noise reducing element can be fed by the feeding belt to the first conveyor belt also by means of just the movement of the first conveyor belt along said feeding direction.

Preferably, the position of said continuous film on the upper surface of said first conveyor belt is adjustable in a direction perpendicular to said feeding direction. In this way, the correct positioning of the continuous film with respect to the noise reducing element is ensured.

Preferably, positioning said noise reducing element on said first conveyor belt comprises arranging said noise reducing element within a first guide rail provided on said first conveyor belt.

Preferably, transferring said noise reducing element to said second conveyor belt comprises feeding said noise reducing element within a second guide rail provided on said second conveyor belt.

The use of guide rails on one or both of the conveyor belts allows the correct positioning and maintaining the desired position of the noise reducing element on the conveyor belt(s).

Preferably, a further noise reducing element is arranged on said first conveyor belt upstream of said noise reducing element along said feeding direction and in close proximity to said noise reducing element.

Such an operation can be repeated a predetermined number of times depending on the circumferential extension of the radially inner surface of the tyre and on the circumferential portion of such a radially inner surface that is wished to be engaged by the aforementioned elements made of sound-absorbing materials. The Applicant has verified that it is preferable for such a circumferential portion to have a circumferential extension equal to at least 70% of the circumferential extension of the radially inner surface of the tyre.

Preferably, detaching said portion of said layer of adhesive material comprises moving said second conveyor belt with respect to said first conveyor belt with a predetermined speed greater than zero.

The Applicant believes that it is possible to obtain a clean and precise detachment as a result even of only a variation in speed of the second conveyor belt with respect to the first conveyor belt (or vice-versa) thanks to the holding action exerted on the first conveyor belt by the noise reducing element arranged upstream of the one which has been transferred to the second conveyor belt. This can occur for example when the adhesive material being used does not have very strong internal bonds, so that the sole pulling effect in the longitudinal direction produced by the relative motion between the second conveyor belt and the first conveyor belt, together with the action of the pressure exerted on the layer of adhesive material by the noise reducing element arranged on the first conveyor belt, produces a clean and precise cut of the layer of adhesive material that adheres to the noise reducing element transferred to the second conveyor belt with respect to the layer of adhesive material arranged on the first conveyor belt.

In preferred embodiments, detaching said portion of said layer of adhesive material comprises cutting said layer of adhesive material at an area located between said first conveyor belt and said second conveyor belt. In this way a clean and precise detachment of the layer of adhesive material is obtained even in cases in which the adhesive material has very strong internal bonds.

Preferably, before cutting said layer of adhesive material, said noise reducing element is spaced from said further noise reducing element along said feeding direction. Such a provision is carried out to be sure that the aforementioned cutting involves only the layer of adhesive material and not also the noise reducing elements.

Preferably, spacing said noise reducing element comprises moving said second conveyor belt with respect to said first conveyor belt with a predetermined relative speed greater than zero. The relative movement of the second conveyor belt with respect to the first conveyor belt is thus used both to obtain the aforementioned detachment and to achieve the aforementioned spacing.

In particularly preferred embodiments, picking up said noise reducing element comprises exerting a suction force on at least part of said at least one second surface of said noise reducing element. Such a provision allows effectively picking up and moving the noise reducing element from the second conveyor without subjecting it to mechanical stresses that could damage it.

Preferably, picking up said noise reducing element comprises exerting on at least part of said at least one second surface of said noise reducing element, at the same time of said suction force, a pressing force from a head end portion of said noise reducing element up to a tail end portion of said noise reducing element. In this way, the effectiveness of the suction force increases and, consequently, the effectiveness of the grip of the noise reducing element increases as well.

Preferably, said pressing force is exerted on said head end portion when said head end portion projects canti-levered from said second conveyor belt.

In preferred embodiments, picking up said noise reducing element comprises exerting on said head end portion of said noise reducing element, at the same time of said suction force, a thrust having a component oriented upwards. In this way, the initial gripping of the noise reducing element is made easier.

Preferably, the guiding device comprises a first conveyor belt movable along a feeding direction.

Preferably, said supporting device for supporting an adhesive material comprises a continuous film supporting a layer of adhesive material, said continuous film being associated with said first conveyor belt and extending on an upper surface of said first conveyor belt.

Preferably, said applicator for applying said adhesive material comprises a pressing member configured to press said noise reducing element against said first conveyor belt so that said noise reducing element adheres firmly to a portion of said layer of adhesive material.

Preferably, a second conveyor belt is arranged downstream of said first conveyor belt and is configured to receive said noise reducing element from said first conveyor belt.

Preferably, said manipulator of said noise reducing element comprises a first robotized arm movable between said second conveyor belt and said tyre for vehicle wheels to pick up said noise reducing element from said second conveyor belt and position it in said predetermined position on said radially inner surface of said tyre.

Preferably, an unwinding reel for unwinding said continuous film is arranged beneath said first conveyor belt at a tail end portion of said first conveyor belt.

Preferably, a winding reel for winding said continuous film is arranged beneath said first conveyor belt at a head end portion of said first conveyor belt.

Preferably, said continuous film extends from said unwinding reel to said winding reel passing over said upper surface of said first conveyor belt.

The continuous film thus remains positioned at the first conveyor belt when the noise reducing element, and the portion of layer of adhesive material associated thereto, moves on the second conveyor belt.

Preferably, said manipulator of said noise reducing element comprises a first gripping member associated with a free end portion of said first robotized arm.

More preferably, a first suction device is associated with said first gripping member.

Even more preferably, said first suction device is able to be selectively activated to pick up, through said first gripping member, said noise reducing element from said second conveyor belt and release it on said tyre.

Preferably, said gripping member comprises a gripping surface having a curved profile.

More preferably, said curved profile has a bending radius substantially equal to that of the inner surface of said tyre along a circumferential direction thereof. In particular, an average bending radius with respect to the bending radii of the inner surfaces of a batch of tyres on which the noise reducing elements must be glued is selected, so as to be able to use the same gripping member irrespective of the size of the specific tyre on which the noise reducing elements must be glued.

Preferably, said gripping surface has an extension which is substantially equal to that of said noise reducing element. This is in order to ensure a grip and an even gluing along the entire surface extension of the noise reducing element.

In first embodiments, a blade is arranged between said first conveyor belt and said second conveyor belt. Such a blade allows the clean and precise detachment of the layer of adhesive material associated with a first noise reducing element just transferred to the second conveyor belt from the layer of adhesive material associated with a second noise reducing element adjacent to said first noise reducing element and still supported by the first conveyor belt.

Preferably, said blade is movable between a rest position distal from a plane to which the upper surface of said first conveyor belt belongs and an operative position in which said blade intersects said plane to which the upper surface of said first conveyor belt belongs.

Preferably, a feeding belt is arranged upstream of said first conveyor belt to feed said noise reducing element to said first conveyor belt.

Preferably, said distributor device comprises a second robotized arm movable between said feeding belt and said first conveyor belt to pick up said noise reducing element from said feeding belt and position it on said first conveyor belt. The transferral of the noise reducing elements from the feeding belt to the first conveyor belt thus takes place in an automated manner.

Preferably, said distributor device comprises a second gripping member associated with a free end portion of said second robotized arm.

More preferably, a second suction device is associated with said second gripping member.

Preferably, said second suction device is able to be selectively activated to pick up, through said second gripping member, said noise reducing element from said feeding belt and release it on said first conveyor belt.

It is also possible to provide for an adjusting device for adjusting the position of said continuous film on the upper surface of said first conveyor belt in a direction perpendicular to said feeding direction.

Preferably, a first guide rail for guiding said noise reducing element is arranged on said first conveyor belt.

Preferably, a second guide rail for guiding said noise reducing element is arranged on said second conveyor belt.

Preferably, a first adjusting device for adjusting the advancing speed of said first conveyor belt is provided.

Preferably, a second adjusting device for adjusting the advancing speed of said second conveyor belt is provided.

Preferably, said first and second adjusting devices can be selectively activated independently from each other. In this way, it is possible to move the second conveyor belt at a different speed from that of the first conveyor belt. Such a provision allows the detachment of the layer of adhesive material associated with the noise reducing element from the layer of adhesive material arranged on the first conveyor belt and also allows two adjacent elements made of sound-absorbing material to be spaced apart from one another before the intervention of the aforementioned blade so as to avoid any risk of damaging the aforementioned noise reducing elements by such a blade.

Preferably, a thrusting member is arranged close to a head end portion of said second conveyor belt, such a thrusting member being configured to exert on said noise reducing element a thrust having a component oriented upwards. In this way, the initial grip of the noise reducing element by the first robotized arm is made easier.

Further characteristics and advantages of the present invention will become clearer from the following detailed description of preferred embodiments thereof, made with reference to the attached drawings.

Figure 1:
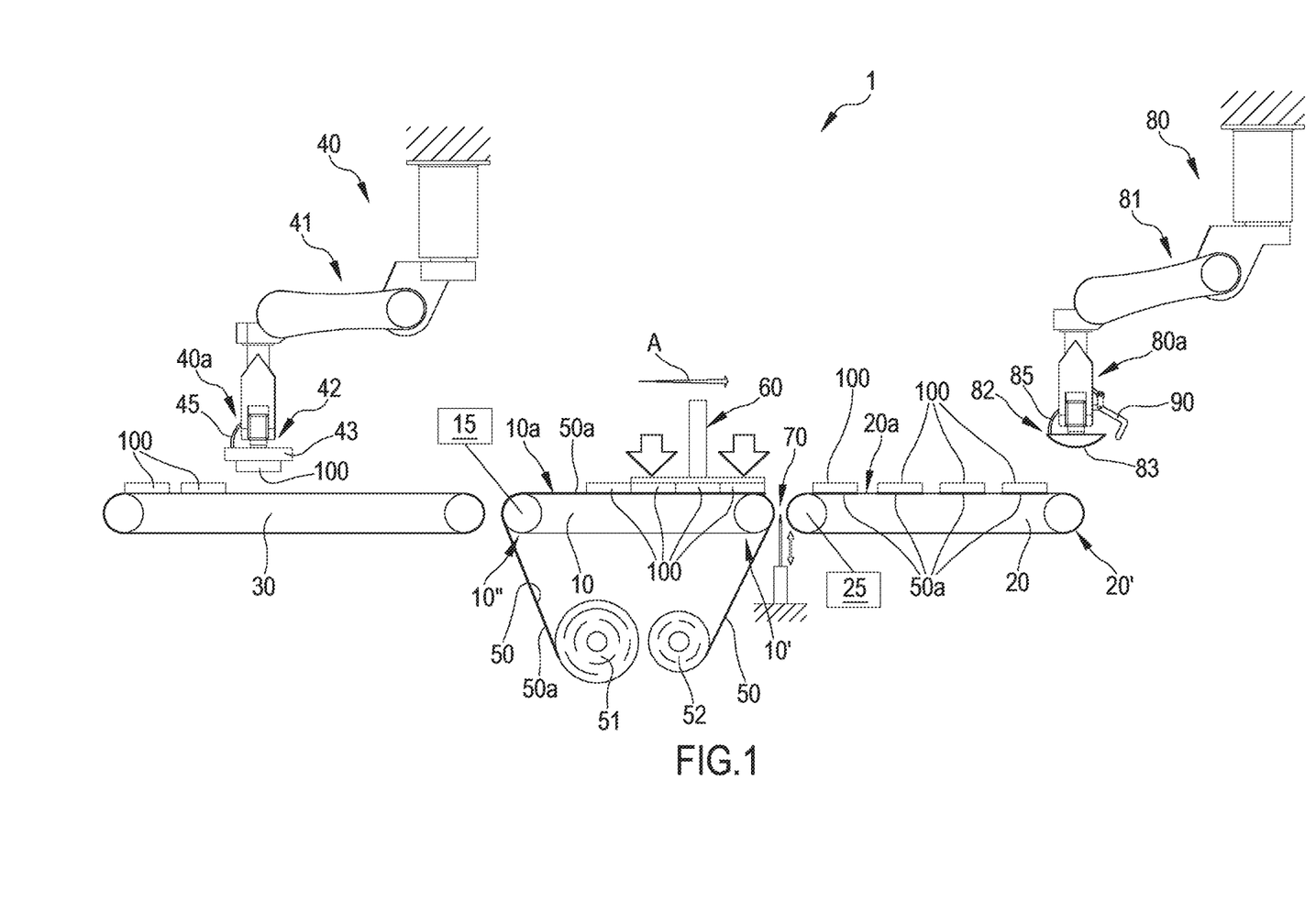
FIG. 1 is a schematic side view of an exemplifying embodiment of an apparatus for automatically applying a noise reducing element to a tyre for vehicle wheels, in accordance with the present invention, such an apparatus being shown in a first operative configuration thereof.

In FIG. 1, reference numeral 1 wholly indicates an exemplifying embodiment of an apparatus for automatically applying a noise reducing element to a tyre for vehicle wheels, in accordance with the present invention.

Figure 3:
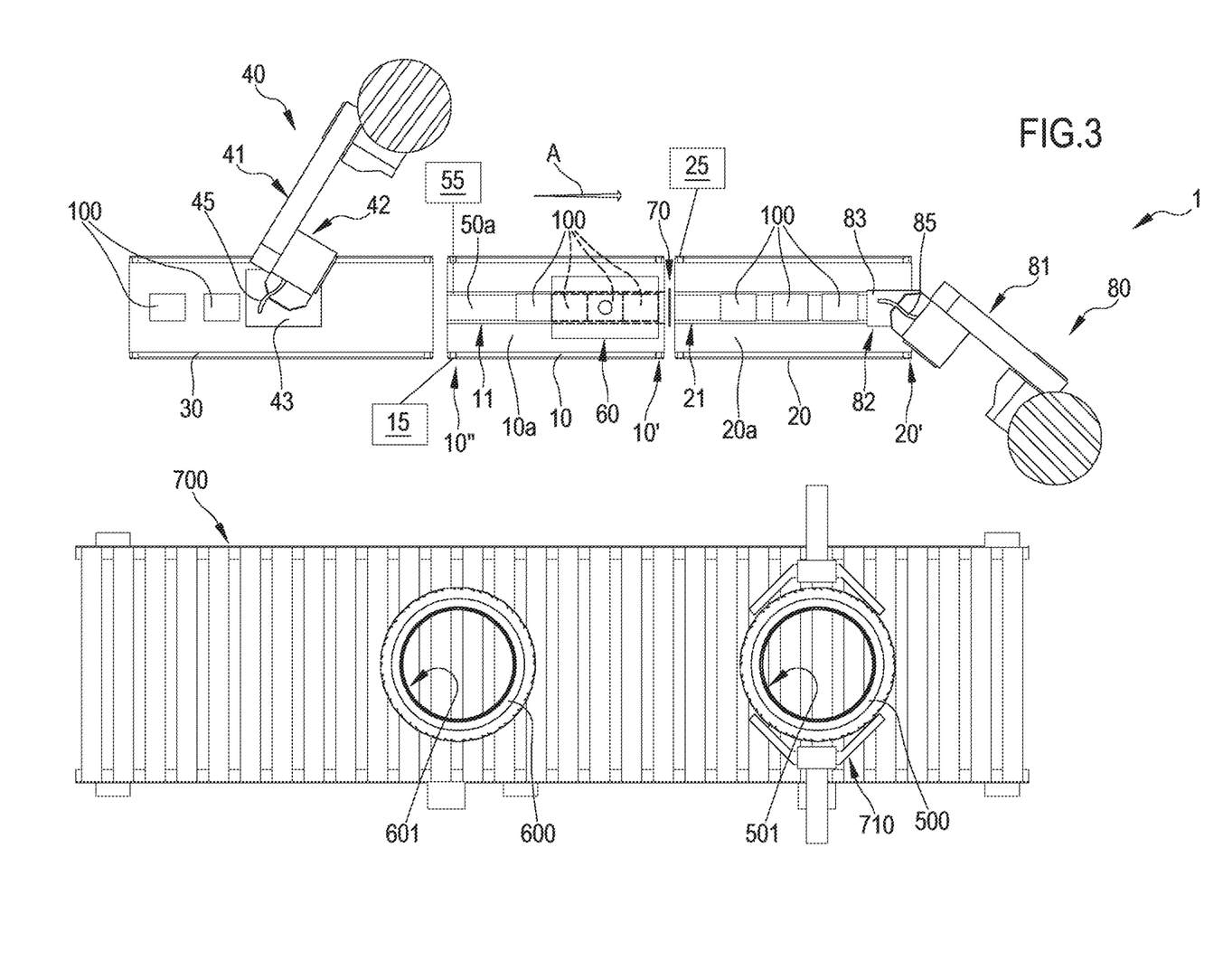
FIG. 3 is a schematic view from above of the apparatus of FIG. 1 in a further operative configuration thereof.
Figure 4:
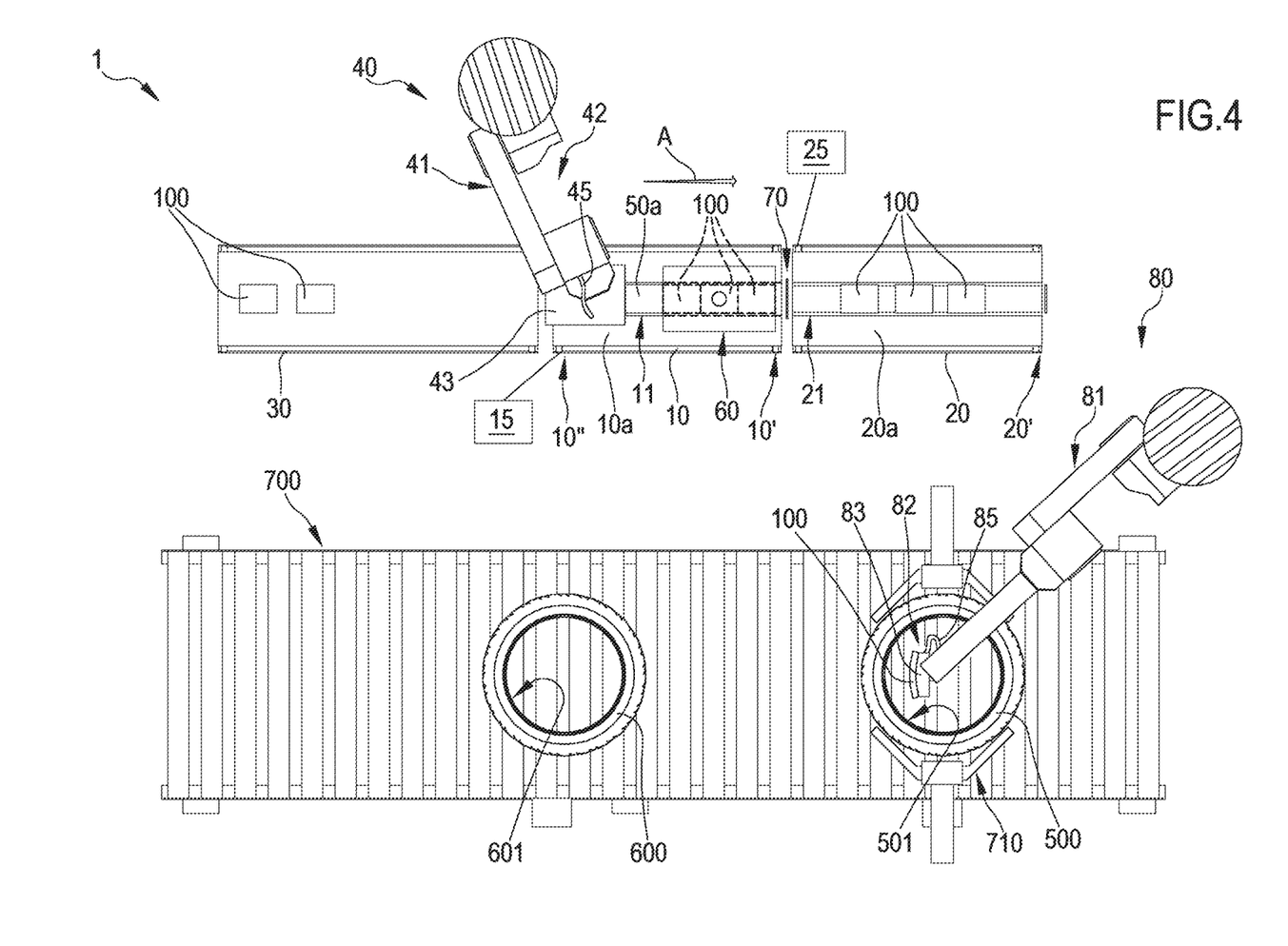
FIG. 4 is a schematic view from above of the apparatus of FIG. 1 in a further operative configuration thereof.
Figure 6:
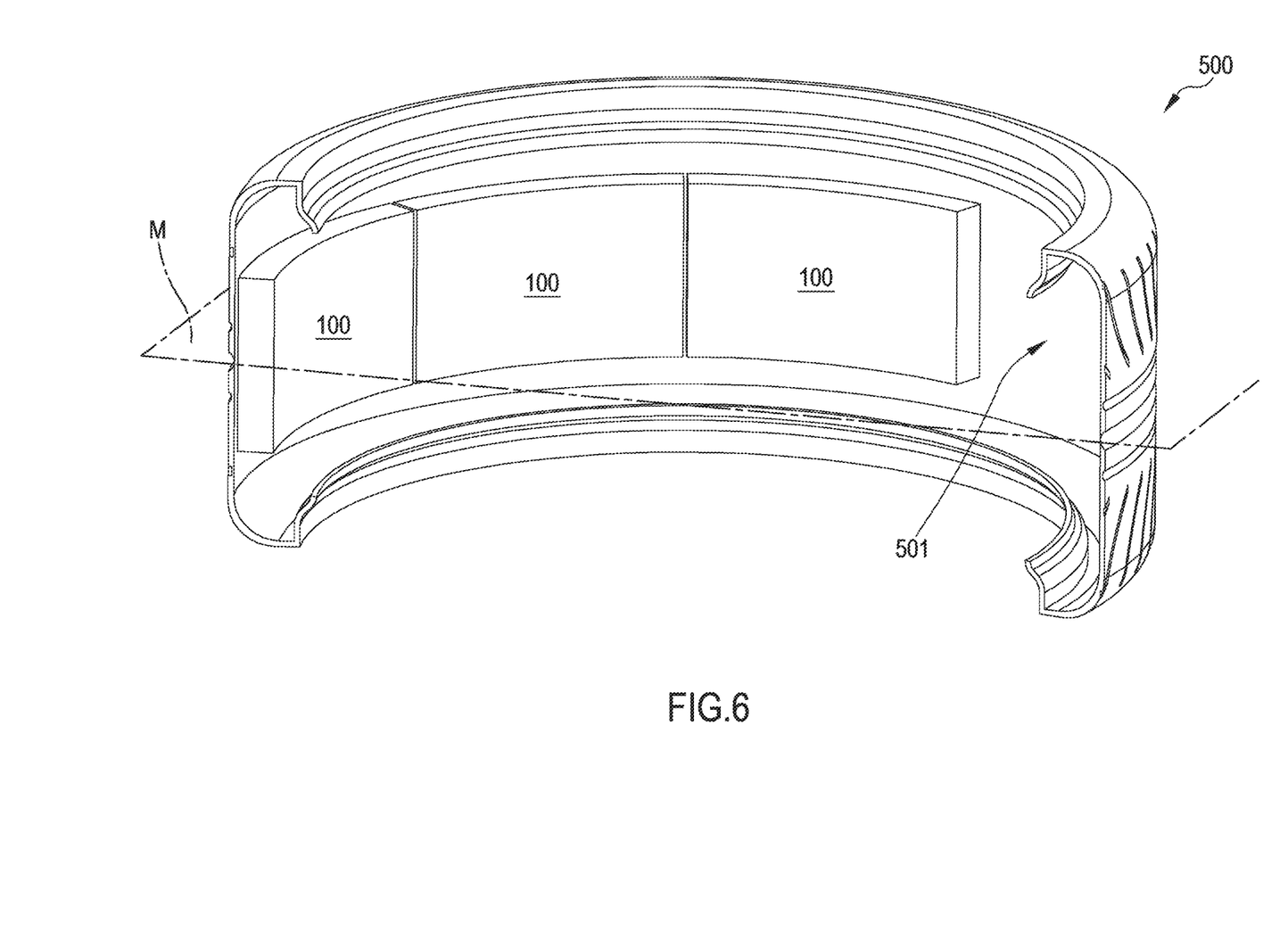
FIG. 6 is a schematic perspective view of a section of a tyre for vehicle wheels on the inner surface of which a plurality of noise reducing elements have been glued, through the apparatus of FIG. 1.

The tyre, shown in FIGS. 3, 4 and 6 and indicated with 500, is preferably a tyre for four-wheeled vehicles, preferably for high-performance vehicles.

The apparatus 1 is used to automatically apply a plurality of noise reducing elements (all indicated with 100 in the figures attached hereto) onto a radially inner surface 501 of the tyre 500. As shown in FIG. 6, the noise reducing elements 100 are glued one after the other along the circumferential direction of the tyre 500, preferably symmetrically with respect to an axial mid-plane M of the tyre 500.

FIGS. 3 and 4 show a further tyre, indicated with 600, on which the noise reducing elements 100 should be glued, again through the apparatus 1 described here, once the gluing process of the noise reducing elements 100 on the tyre 500 is completed.

The tyres 500 and 600 are preferably arranged on a roller conveyor belt 700. The tyre 500 on which the noise reducing elements 100 are glued is held in position, during the gluing operations, by suitable holding members 710.

The noise reducing elements 100 preferably have a rectangular parallelepiped shape. More preferably, they have a width comprised between about 100 mm and about 250 mm, a length comprised between about 100 mm and about 300 mm and a thickness comprised between about 15 mm and about 50 mm. However, noise reducing elements 100 can have shapes and sizes different from those indicated herein.

As shown in FIG. 6, preferably the noise reducing elements 100 are glued onto the radially inner surface 501 of the tyre 100 along the circumferential direction of the latter by arranging the longer sides of the noise reducing elements 100 substantially parallel to the axial mid-plane M of the tyre 100.

Preferably, the mutual positioning of the noise reducing elements 100 on the radially inner surface 501 of the tyre 100 is such as to leave a gap between two adjacent noise reducing elements 100. However, noise reducing elements 100 can be in direct contact with each other as well.

Preferably, the circumferential extension of the portion of radially inner surface 501 of the tyre 500 on which the noise reducing elements 100 are glued (hereafter, reference will be made to such circumferential extension using the term "coverage") is equal to at least 50% of the circumferential extension of the radially inner surface 501 of the tyre 500. Depending on the circumferential size of the tyre 100, the aforementioned coverage can for example be comprised between about 70% and about 90%, preferably between about 71% and about 85% of the circumferential extension of the radially inner surface 501 of the tyre 500. As the circumferential size of the tyre 500 varies, if necessary, noise reducing elements 100 having different lengths can be used to obtain the desired coverages.

The noise reducing elements 100 are preferably made from sound-absorbing material, using foamed polymeric material (for example open cell foamed polyurethane). However, a different material having similar abilities to reduce noise can be used as well.

The density of the noise reducing elements 100 is preferably comprised between about 20 $Kg/m^3$ and about 200 $Kg/m^3$. In a specific embodiment, such a density is equal to about 40 $Kg/m^3$.

Figure 2:
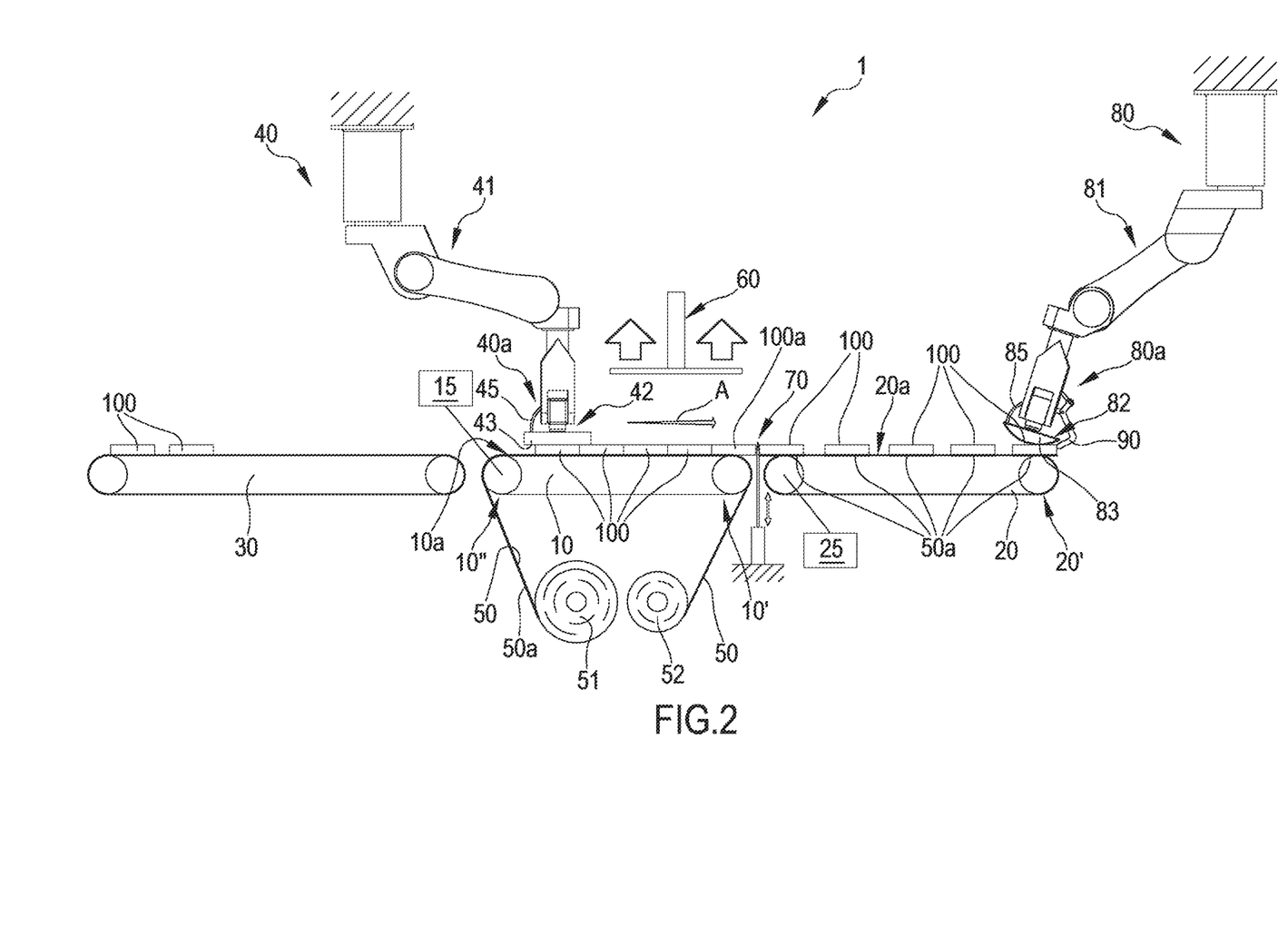
FIG. 2 is a schematic side view of the apparatus of FIG. 1 in a second operative configuration thereof.

With particular reference to FIGS. 1 and 2, the apparatus 1 comprises a first conveyor belt 10 that is movable along a feeding direction A.

A second conveyor belt 20 is arranged downstream of the first conveyor belt 10. The second conveyor belt 20 is also movable along a feeding direction A and is preferably made with anti-adhesive material, for example it is made anti-adhesive through a surface treatment with silicones.

Preferably, in the embodiment shown herein, a feeding belt 30 is provided upstream of the first conveyor belt 10. The feeding belt 30 is also movable along the feeding direction A.

The feeding belt 30 and the two conveyor belts 10 and 20 are aligned and arranged in succession along the feeding direction A.

The first conveyor belt 10 is configured to receive, on the upper surface 10a thereof, the noise reducing elements 100 previously arranged on the feeding belt 30 to then pass them up to the second conveyor belt 20.

The passage of the noise reducing elements 100 from the first conveyor belt 10 to the second conveyor belt 20 takes place as a result of the movement of the first conveyor belt 10 along the feeding direction A.

The passage of the elements 100 made of sound-absorbing material from the feeding belt 30 to the first conveyor belt 10 preferably takes place as a result of the movement of the feeding belt 30 along the feeding direction A, or through the use of a second robotized arm 40 movable between a gripping position defined at the feeding belt 30 (FIG. 1) and a release position defined at the first conveyor belt 10 (FIG. 2).

The first conveyor belt 10 and the second conveyor belt 20 are movable along the feeding direction A upon command of respective drive members (not shown).

Each of the aforementioned drive members is associated with a respective adjusting device 15, 25 which adjusts the advancing speed of the respective first and second conveyor belt 10, 20. Such adjusting devices 15, 25 act selectively on the respective drive members independently from each other so as to be able to move, when desired, the second conveyor belt 20 at a different speed from that of the first conveyor belt 10.

As shown in FIGS. 3 and 4, respective rails 11, 21 for guiding the noise reducing elements 100 are preferably arranged on the conveyor belts 10 and 20. Such rails 11, 21 allow the correct positioning and centering, along a direction perpendicular to the feeding direction A, of the noise reducing elements 100 respectively on the upper surface 10*a* of the first conveyor belt 10 and on the upper surface 20*a* of the second conveyor belt 20.

The noise reducing elements 100 positioned on the feeding belt 30 are previously picked up from a suitable storage device (not shown) for example through the second robotized arm 40 or a further robotized arm (not shown).

Alternatively, the aforementioned noise reducing elements 100 can be formed by cutting them from a sheet of large dimensions (for example 800×1200 mm) positioned close to the feeding belt 30.

The second robotized arm 40 is preferably of the aerial type (i.e. it is associated with the ceiling or with an aerial rod), so as not to take up space on the floor. However, as an alternative it is possible to use a robotized arm constrained to the floor.

The second robotized arm 40 comprises an articulated kinematism member 41 that allows the movement of the second robotized arm 40 along any direction in space. At a free end thereof 40*a*, the second robotized arm 40 comprises a gripping member 42 configured to pick up the noise reducing elements 100 and hold them in position during the movement of the second robotized arm 40.

In the embodiment shown herein, the gripping member 42 comprises a gripping element 43 preferably including a plurality of suction channels (not shown) fluid-dynamically connected to a suction device 45 capable to be selectively activated. Therefore, the gripping of the noise reducing elements 100 from the feeding belt 30 and the holding of such noise reducing elements 100 during the movement of the second robotized arm 40 towards the first conveyor belt 10 takes place thanks to the suction force exerted on the aforementioned noise reducing elements 100 once the aforementioned suction device 45 has been activated. The release of the noise reducing elements 100 on the first conveyor belt 10, on the other hand, takes place following the deactivation of the aforementioned suction device 45.

In an alternative embodiment which is not shown, the gripping member 42 can comprise a plurality of retractable hooks suitably commanded to capture/release the noise reducing elements 100.

As will be described better hereafter, when the noise reducing elements 100 pass from the feeding belt 30 to the first conveyor belt 10 they are without any adhesive material. Once the noise reducing elements 100 are arranged on the first conveyor belt 10, the lower face thereof is made to adhere firmly to a portion of a layer of adhesive material 50*a*, preferably a pressure sensitive material, specifically provided on the upper surface 10*a* of the first conveyor belt 10. When the noise reducing elements 100 pass from the first conveyor belt 10 to the second conveyor belt 20, the aforementioned portion of layer of adhesive material 50*a* remains associated with the lower face of the aforementioned noise reducing elements 100.

As shown in FIGS. 1 and 2, the aforementioned layer of adhesive material 50*a* is initially associated with a face of a continuous film 50 suitably connected to the first conveyor belt 10. The continuous film 50 thus acts as a support for the layer of adhesive material 50*a* before it is transferred to the noise reducing elements 100.

The continuous film 50 is unwound from an unwinding reel 51 preferably arranged beneath the first conveyor belt 10 at a tail end portion 10" thereof and, following the unwinding from the unwinding reel 51, it is collected on a winding reel 52 preferably arranged beneath the first conveyor belt 10 at a head end portion 10' thereof. The continuous film 50 extends from the unwinding reel 51 to the winding reel 52 passing over the upper surface 10*a* of the first conveyor belt 10.

Following the positioning of a noise reducing element 100 on the upper surface 10*a* of the first conveyor belt 10, the portion of layer of adhesive material 50*a* which is located beneath such a noise reducing element 100 attaches firmly to the lower face of the noise reducing element 100 and remains attached to such a noise reducing element 100 even when the latter is transferred to the second conveyor belt 20. Therefore, the portion of continuous film 50 wound on the winding reel 52 is substantially free from the aforementioned layer of adhesive material 50*a*. In particular, it comprises a minimal amount of adhesive material 50*a*, corresponding to the adhesive material 50*a* which is provided in the spaces defined between two adjacent noise reducing elements 100 arranged on the first conveyor belt 10.

The continuous film 50 is preferably made from an anti-adhesive material (for example paper or polymeric material like polyethylene PE, polypropylene PP or polyethylene terephthalate PET, whose surface is treated with silicones). The adhesion force of the layer of adhesive material 50*a* on the continuous film 50 is therefore substantially lower than that of adhesion of the layer of adhesive material 50*a* on the lower face of the noise reducing elements 100.

Such a continuous film 50 has a length equal to or greater than that of the noise reducing elements 100. Preferably, the possible difference in width between continuous film 50 and noise reducing elements 100 is not greater than about 2 mm.

The continuous film 50 preferably has a thickness (including the layer of adhesive material 50*a*) comprised between 30 and 150 m, for example equal to about 80 m.

Examples of continuous film 50 (provided with the layer of adhesive material 50*a*) that can be used are: 300LSE and 9773 from 3M Company and 5015T from Nitto Europe NV.

Preferably, the apparatus 1 also comprises an adjusting device 55 for adjusting the position of the continuous film 50 on the upper surface 10*a* of the first conveyor belt 10 in a direction perpendicular to the feeding direction. Such an adjusting device 55 is schematically shown only in FIG. 3. It allows the correct mutual positioning between noise reducing elements 100 and continuous film 50.

The adjusting device 55 comprises for example a pair of photocells (not shown) that detect the alignment between each noise reducing element 100 and the continuous film 50 and a drive member (not shown) that moves the continuous film as a function of the signal detected by the photocells.

Preferably, as shown in FIGS. 1 and 2, a pressing member 60 is provided above the first conveyor belt 10. The pressing member 60 is movable, preferably along a substantially vertical direction, between an operative position, proximal to the upper surface 10a of the first conveyor belt 10, and a rest position, distal from the upper surface 10a of the first conveyor belt 10. In the aforementioned operative position, the pressing member 60 presses one or more noise reducing elements 100 against the first conveyor belt 10 so as to ensure that each of such noise reducing elements 100 can adhere firmly to a respective portion of layer of adhesive material 50a. In the aforementioned rest position, the pressing member 60 is moved away from the aforementioned noise reducing elements 100 and therefore does not carry out any action on the noise reducing elements 100 (FIG. 2).

Preferably, the pressing member 60 is arranged at a head end portion 10' of the first conveyor belt 10.

Alternatively or in addition to the pressing member 60, the desired pressing action of the noise reducing elements 100 onto the first conveyor belt 10 can be obtained as a result of the thrust exerted on the noise reducing elements 100 by the gripping member 43 of the second robotized arm 40 when such noise reducing elements 100 are deposited onto the first conveyor belt 10.

In the embodiment illustrated herein, a blade 70 is arranged between the first conveyor belt 10 and the second conveyor belt 20. Such a blade 70 is movable, preferably along a substantially vertical direction, between a rest position, distal from a plane to which the upper surface 10a of the first conveyor belt 10 belongs (FIG. 1), and an operative position in which the blade 70 intersects the aforementioned plane (FIG. 2).

When it is in the rest position thereof, the blade 70 does not carry out any action. On the other hand, when the blade 70 is in the operative position thereof, it cuts the layer of adhesive material 50a associated with a noise reducing element 100 just transferred to the second conveyor belt 20, separating such a layer of adhesive material 50a from the layer of adhesive material 50a associated with a noise reducing element 100a adjacent to the aforementioned noise reducing element 100 and about to be transferred from the first conveyor belt 10 to the second conveyor belt 20, as shown in FIG. 2.

If the adhesive material 50a used does not have very strong internal bonds, the blade 70 is not necessary. In this case, the detachment of the layer of adhesive material 50a adhered to the noise reducing element transferred to the second conveyor belt 20 from the layer of adhesive material associated with the noise reducing element 100a arranged on the first conveyor belt 10 takes place only as a result of a variation in speed of the second conveyor belt 20 with respect to the first conveyor belt 10 and thanks to the holding action exerted on the first conveyor belt 10 by the pressing force exerted on the noise reducing element 100a by the pressing member 60.

The apparatus 1 also comprises, close to the second conveyor belt 20, a first robotized arm 80 configured to pick up the noise reducing elements 100 from the second conveyor belt 20 and position them in the desired position on the radially inner surface 501 of the tyre 500. Such a positioning can also be obtained by exerting a suitable pressure.

The first robotized arm 80 is preferably of the aerial type (i.e. it is configured to be associated with the ceiling or with an aerial rod) so as not to take up space on the floor. However, as an alternative it is possible to use a robotized arm constrained to the floor.

The first robotized arm 80 comprises an articulated kinematism member 81 that allows the movement of the first robotized arm 80 along any direction in space. At a free end 80a thereof the first robotized arm 80 comprises a gripping member 82 configured to pick up the noise reducing elements 100 from the second conveyor belt 20 and hold it in position during the movement of the first robotized arm 80 towards the tyre 500.

In the embodiment shown herein, the gripping member 82 comprises a gripping element 83 preferably including a plurality of suction channels (not shown) fluid-dynamically connected to a suction device 85 capable to be selectively activated. Therefore, the gripping of the noise reducing elements 100 from the second conveyor belt 20 and their holding during the movement of the first robotized arm 80 towards the tyre 500 takes place as a result of the suction force exerted on the noise reducing elements 100 once the aforementioned suction device 85 has been activated. The release of the noise reducing elements 100 on the radially inner surface 501 of the tyre 500, on the other hand, takes place following the deactivation of the aforementioned suction device 85.

As shown in FIGS. 5a-5d, the gripping element 83 comprises a gripping surface 83a having a curved profile. Preferably, the profile of the gripping surface 83a has a bending radius substantially equal to that of the inner surface 501 of the tyre 500 along the circumferential direction thereof. In particular, the value of the bending radius of the gripping surface 83a is substantially equal to an average value of the bending radii of the inner surfaces of a batch of tyres 500, 600 on the noise reducing elements 100 will have to be glued.

Preferably, the gripping surface 83a has substantially the same extension as that of the noise reducing element 100.

In an alternative embodiment, the gripping member 82 can comprise a plurality of retractable hooks which can be properly commanded to capture/release the noise reducing elements 100.

The apparatus 1 also comprises, close to a head end portion 20' of the second conveyor belt 20, a thrusting member 90 configured to exert on the noise reducing element 100 arranged on the second conveyor belt 20 a thrust having a component oriented upwards when said noise reducing element 100 is about to or begins to be picked up by the gripping member 82.

Figures 5A, 5B, 5C, 5D:
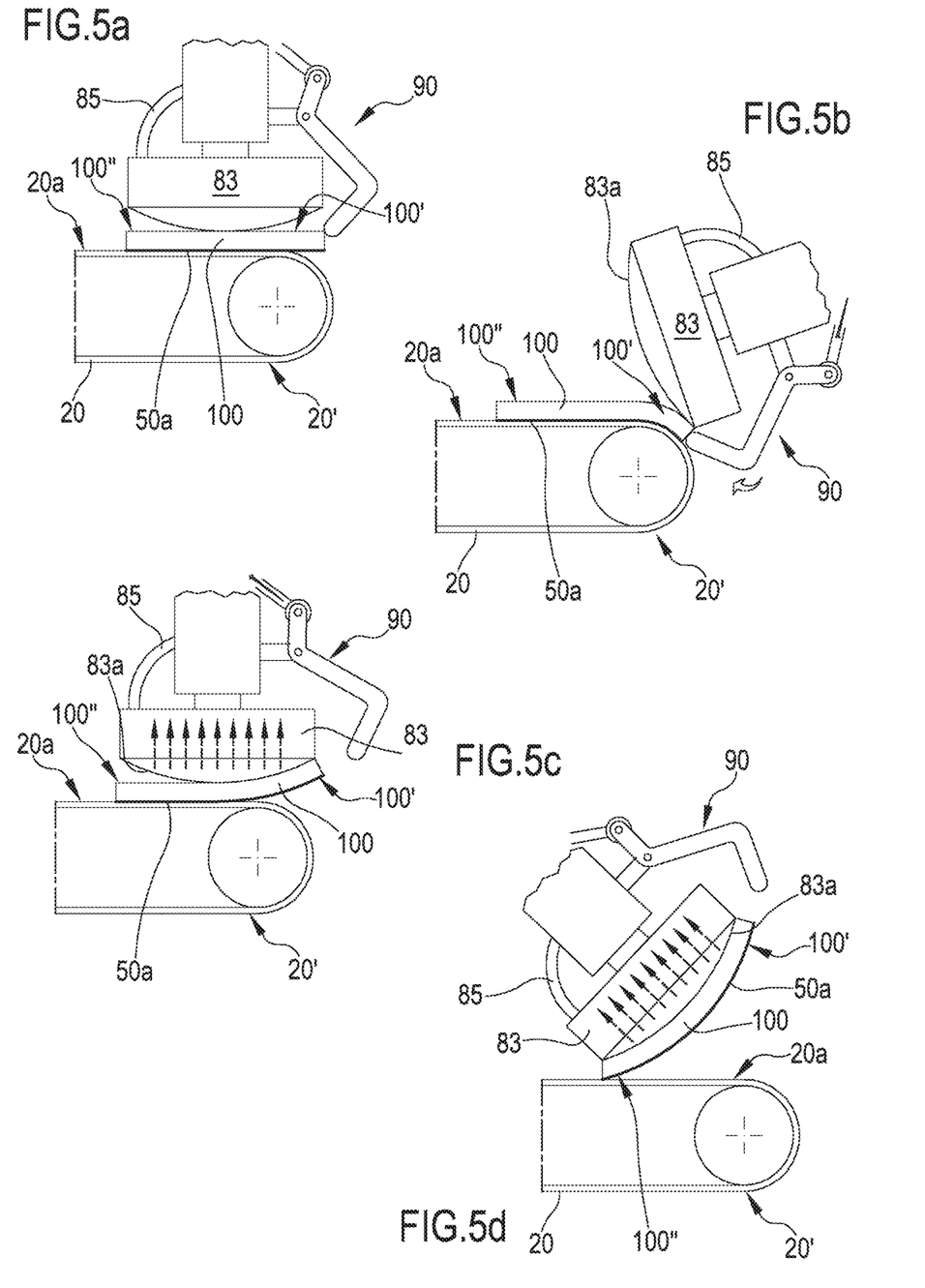
FIGS. 5a, 5b, 5c and 5d show a portion of the apparatus of FIG. 1 in subsequent operative configurations.

In the embodiment shown herein, the thrusting member 90 is movable between an operative position (shown in FIGS. 2, 5a and 5b) and a rest position (shown in FIGS. 1, 5c and 5d). The thrusting member 90 exerts the aforementioned thrust when it is in the operative position thereof.

In the specific example shown in the aforementioned figures, the thrusting member 90 comprises a thrusting element 90a associated with a lever 90b preferably pivoted to said first robotized arm 80.

A preferred embodiment of a process for automatically applying the noise reducing elements 100 to the tyre 500 will now be described. In particular, this process can be carried out by the apparatus 1 described above.

Initially, as shown in FIG. 1, the noise reducing elements 100 are sequentially positioned on the feeding belt 30, which is moved with a predetermined speed along the feeding direction A. Such movement takes place in a sequential and alternate manner with respect to the positioning of the noise reducing elements 100 on the feeding belt 30, each time with an advancing steps of predetermined length.

The positioning of the noise reducing elements 100 on the feeding belt 30 can be carried out by a robotized arm, for example the second robotized arm 40 shown in FIGS. 1-4, or manually by an operator, picking up the noise reducing elements 100 from a suitable storage device arranged close to the feeding belt 30. Alternatively, the noise reducing elements 100 can be obtained by cutting them from a sheet of large dimensions positioned close to the feeding belt 30.

The elements 100 made of sound-absorbing material are picked up in sequence by the gripping member 43 of the second robotized arm 40 and moved to the first conveyor belt 10, which is also motorised with a predetermined speed along the feeding direction A. As described above, in the embodiment shown herein, the picking up of the noise reducing elements 100 from the feeding belt 30, and the holding thereof during the movement towards the first conveyor belt 10, takes place as a result of the suction force exerted by the gripping member 42 on the noise reducing elements 100.

The noise reducing elements 100 are arranged on the first conveyor belt 10 within the guide rail 11, providing, or not, a gap between two adjacent noise reducing elements 100. In the embodiment shown herein, the noise reducing elements 100 are arranged on the first conveyor belt 10 substantially in contact with each other.

The positioning of the noise reducing elements 100 on the first conveyor belt 10 takes place in sequence each time after movement of the first conveyor belt 10 along the feeding direction A with an advancing step of predetermined length. Such movement causes the unwinding of a longitudinal portion of the continuous film 50, provided with adhesive material 50*a*, from the unwinding reel 51 and the winding of a corresponding longitudinal portion of the continuous film 50, substantially without adhesive material 50*a*, on the winding reel 52.

The noise reducing elements 100 are pressed against the upper surface 10*a* of the first conveyor belt 10 so that they can adhere firmly to the layer of adhesive material 50*a* associated with the continuous film 10 arranged on the upper surface 10*a* of the first conveyor belt 10. Such a pressing action can be exerted by the second robotized arm 40 or, preferably, by the pressing member 60 arranged above the first conveyor belt 10.

Thereafter, the noise reducing elements 100 are transferred from the first conveyor belt 10 to the second conveyor belt 20, being positioned within the guide rail 21. Such a transfer takes place as a result of the movement of the first conveyor belt 10 along the feeding direction A. In the aforementioned transfer the portion of layer of adhesive material 50*a* associated with the lower face of the noise reducing elements 100 remains fixedly connected to the latter.

If necessary or desired, the position of the continuous film 50 on the first conveyor belt 10 in a direction perpendicular to the feeding direction A can be suitably adjusted, so that the noise reducing elements that are positioned on the continuous film 50 are centred with respect to the latter along the aforementioned direction perpendicular.

During the aforementioned transferral, the second conveyor belt 20 is also moved in sequence along the feeding direction A with advancing steps adjusted preferably through a photocell (not shown) arranged at the end of the aforementioned second conveyor belt 20.

Preferably, in the time period in which the second conveyor belt 20 moves, the movement speed thereof is greater than that of the first conveyor belt 10 (where the noise reducing elements 100 are preferably substantially in contact with each other) in the same time period, so as to obtain a desired spacing apart of the noise reducing elements 100 on the second conveyor belt 20, as shown in FIGS. 1 and 2. For example, it is ensured that the noise reducing elements 100 are located on the second conveyor belt 20 at a distance apart greater than about 1 mm, preferably comprised between about 1 mm and about 3-5 mm.

If the internal bonds of the layer of adhesive material 50*a* are not very strong, the greater speed of the second conveyor belt 20 with respect to the first conveyor belt 10 also allows a clean and precise detachment of the layer of adhesive material 50*a* associated with the noise reducing element 100 arranged on the second conveyor belt 20 from the layer of adhesive material 50*a* associated with the continuous film 50 that winds on the winding reel 52. In the preferred case in which the noise reducing elements 100 arranged on the first conveyor belt 10 are in contact with each other, the aforementioned detachment takes place with respect to the layer of adhesive material 50*a* associated with the noise reducing element 100*a* still arranged on the first conveyor belt 10 and about to be transferred to the second conveyor belt 20 (FIG. 2).

If, on the other hand, the internal bonds of the layer of adhesive material 50*a* are such as not to allow the aforementioned clean and precise detachment, such detachment is obtained as a result of the incision carried out by the blade 70. Advantageously, the higher speed of the second conveyor belt 20 with respect to the first conveyor belt 10 allows the noise reducing element 100 to be sufficiently spaced apart from the element 100*a* made of sound-absorbing material about to be transferred from the first conveyor belt 10 to the second conveyor belt 20, so as to prevent the blade 70 from being able to accidentally cut one or both of the aforementioned noise reducing elements 100, 100*a*.

The noise reducing elements 100 arranged on the second conveyor belt 20 are subsequently picked up in sequence from the second conveyor belt 20 (FIGS. 2 and 3) to be transferred towards the tyre 500 (FIG. 4) and positioned (and thus glued) at respective predetermined positions on the radially inner surface 501 thereof (FIG. 6). Such picking up and transferal is carried out by the gripping member 82 of the first robotized arm 80, as shown in detail in FIGS. 5*a*-5*d*.

The picking up of the noise reducing elements 100 from the second conveyor belt 20, and the holding thereof during the movement towards the tyre 500, takes place as a result of the suction force exerted by the gripping member 82 on the noise reducing elements 100.

Preferably, the initial gripping of the noise reducing elements 100 from the second conveyor belt 20 is made easier by the upward thrust exerted on each noise reducing element 100 by the thrusting member 90.

In particular, as soon as a head end portion 100' of a noise reducing element 100 projects canti-levered from the second conveyor belt 20, the thrusting member 90 is activated (for example pneumatically) and brought into contact with such a head end portion 100' (FIG. 5*a*). At the same time, the gripping member 82 is brought by the first robotized arm 80 above the aforementioned noise reducing element 100 and a pressing force is exerted on the head end portion 100' of the noise reducing element 100 by a corresponding end portion of the gripping surface 83*a* of the gripping member 82 (FIG. 5*b*).

At least in part simultaneously with the application of the aforementioned pressing force the suction device 85 is activated, so as to exert on the head end portion 100' of the noise reducing element 100 a suction force that is sufficient to lift it from the second conveyor belt 20.

While the suction device is active the gripping member 82 is rotated with respect to the noise reducing element 100 so as to exert the aforementioned pressing force progressively on adjacent portions of the noise reducing element 100 (FIG. 5c) until the tail end portion 100" thereof is reached (FIG. 5d). The entire noise reducing element 100 is at this point firmly associated with the gripping surface 83a of the gripping member 82 and can thus be moved by the first robotized arm 80 towards the tyre 500 (FIG. 4).

Once it has reached the tyre 500, the first robotized arm 80 arranges the gripping member 82 so that the layer of adhesive material 50a associated with the noise reducing element 100 held by it faces the radially inner surface 501 of the tyre 500. Thereafter the gluing of the noise reducing element 100 inside the tyre 500 is carried out.

The aforementioned operations of gripping the noise reducing element 100 from the second conveyor belt 20 and gluing onto the radially inner surface 501 of the tyre 500 are repeated in sequence for a plurality of noise reducing elements 100 until the desired coverage of the radially inner surface 501 of the tyre 500 is obtained.

Once the gluing operations of all of the noise reducing elements 100 are complete, the tyre 500 is for example picked up by a suitable robotized arm and replaced by the tyre 600 (FIG. 4).

The process described above is repeated identically to apply a plurality of elements 100 made from sound-absorbing material on the radially inner surface 601 of the tyre 600.

The present invention has been described with reference to some preferred embodiments. Various changes can be made to the embodiments described above, whilst still remaining within the scope of protection of the invention, defined by the following claims.

The invention claimed is:

1. A process for applying a noise reducing element to a tyre for vehicle wheels, comprising:
   a) providing the noise reducing element;
   b) providing a first conveyor belt movable along a feeding direction and having, on an upper surface thereof, a continuous film supporting a layer of adhesive material;
   c) guiding said noise reducing element according to a predetermined direction, wherein guiding said noise reducing element comprises arranging said noise reducing element on the layer of adhesive material arranged on the first conveyor belt;
   d) during said guiding, applying said adhesive material onto a first surface of said noise reducing element;
   e) gripping said noise reducing element by a manipulator which interacts with at least one second surface of said noise reducing element different from said first surface on which said adhesive material has been applied and moving the manipulator towards the tyre; and
   f) positioning said noise reducing element by the manipulator in a predetermined position on a radially inner surface of said tyre and fixating said noise reducing element to said radially inner surface via said adhesive material.

2. The process according to claim 1, comprising, cyclically repeating actions from a) to f) so as to cover a predetermined portion of said radially inner surface of said tyre with a plurality of noise reducing elements.

3. The process according to claim 1, wherein applying said adhesive material onto the first surface of said noise reducing element comprises pressing said noise reducing element against said first conveyor belt so that said noise reducing element adheres firmly to a portion of said layer of adhesive material.

4. The process according to claim 3, comprising, as a result of the movement of said first conveyor belt along said feeding direction, transferring said noise reducing element to a second conveyor belt arranged downstream of said first conveyor belt while holding said continuous film at said first conveyor belt.

5. The process according to claim 4, comprising, detaching said portion of said layer of adhesive material from the layer of adhesive material arranged on said first conveyor belt when said noise reducing element has left said first conveyor belt.

6. The process according to claim 5, wherein gripping said noise reducing element comprises picking up by the manipulator said noise reducing element with said portion of said layer of adhesive material firmly adhered thereto, from said second conveyor belt.

7. The process according to claim 1, wherein arranging said noise reducing element on said first conveyor belt comprises:
   picking up said noise reducing element from a feeding belt or a storage device arranged upstream of said first conveyor belt; and
   positioning said noise reducing element on said first conveyor belt.

8. The process according to claim 7, wherein picking up said noise reducing element comprises exerting a suction force on said noise reducing element.

9. The process according to claim 1, comprising, adjusting a position of said continuous film on the upper surface of said first conveyor belt in a direction perpendicular to said feeding direction.

10. The process according to claim 1, wherein positioning said noise reducing element on said first conveyor belt comprises arranging said noise reducing element within a first guide rail provided on said first conveyor belt.

11. The process according to claim 4, wherein transferring said noise reducing element to said second conveyor belt comprises feeding said noise reducing element within a second guide rail provided on said second conveyor belt.

12. The process according to claim 1, comprising, arranging a further noise reducing element on said first conveyor belt upstream of said noise reducing element along said feeding direction and in close proximity to said noise reducing element.

13. The process according to claim 5, wherein detaching said portion of said layer of adhesive material comprises moving said second conveyor belt with respect to said first conveyor belt with a predetermined speed greater than zero.

14. The process according to claim 5, wherein detaching said portion of said layer of adhesive material comprises cutting said layer of adhesive material at an area located between said first conveyor belt and said second conveyor belt.

15. The process according to claim 14, comprising:
   arranging a further noise reducing element on said first conveyor belt upstream of said noise reducing element along said feeding direction and in close proximity to said noise reducing element; and
   before cutting said layer of adhesive material, spacing said noise reducing element from said further noise reducing element along said feeding direction.

16. The process according to claim 15, wherein spacing said noise reducing element comprises moving said second conveyor belt with respect to said first conveyor belt with a predetermined relative speed greater than zero.

17. The process according to claim 6, wherein picking up said noise reducing element comprises exerting a suction force on at least part of said at least one second surface of said noise reducing element.

18. The process according to claim 17, wherein picking up said noise reducing element comprises exerting on at least part of said at least one second surface of said noise reducing element, at the same time of said suction force, a pressing force from a head end portion of said noise reducing element up to a tail end portion of said noise reducing element.

19. The process according to claim 18, wherein said pressing force is exerted on said head end portion when said head end portion projects cantilevered from said second conveyor belt.

20. The process according to claim 18, wherein picking up said noise reducing element comprises exerting on said head end portion of said noise reducing element, at the same time of said suction force, a thrust having a component oriented upwards.

21. An apparatus for applying a noise reducing element to a tyre for vehicle wheels, comprising:
- a distributor device for distributing noise reducing elements;
- a supporting device for supporting an adhesive material that is separate from the noise reducing elements, the supporting device comprising a first conveyor belt movable along a feeding direction and having, on an upper surface thereof, a continuous film supporting a layer of the adhesive material;
- a guiding device for guiding a noise reducing element according to a predetermined direction, wherein guiding said noise reducing element comprises arranging said noise reducing element on the layer of adhesive material arranged on the first conveyor belt;
- an applicator for applying said adhesive material on a first surface of said noise reducing element; and
- a manipulator of said noise reducing element comprising a first gripping member, the manipulator configured to interact, via the first gripping member, with a second surface of said noise reducing element different from said first surface and to position said noise reducing element in a predetermined position on a radially inner surface of said tyre, bringing said first surface into contact with said radially inner surface.

22. The apparatus according to claim 21, wherein said applicator for applying said adhesive material comprises a pressing member configured to press said noise reducing element against said first conveyor belt so that said noise reducing element adheres firmly to a portion of said layer of adhesive material.

23. The apparatus according to of claim 21, further comprising a second conveyor belt arranged downstream of said first conveyor belt and configured to receive said noise reducing element from said first conveyor belt.

24. The apparatus according to claim 23, wherein said manipulator of said noise reducing element comprises a first robotized arm movable between said second conveyor belt and said tyre for vehicle wheels to pick up said noise reducing element from said second conveyor belt and position said noise reducing element in said predetermined position on said radially inner surface of said tyre.

25. The apparatus according to claim 21, further comprising:
- an unwinding reel for unwinding said continuous film, said unwinding reel being arranged beneath said first conveyor belt at a tail end portion of said first conveyor belt; and
- a winding reel for winding said continuous film, said winding reel being arranged beneath said first conveyor belt at a head end portion of said first conveyor belt, wherein said continuous film extends from said unwinding reel to said winding reel passing over said upper surface of said first conveyor belt.

26. The apparatus according to claim 24, wherein said first gripping member is associated with a free end portion of said first robotized arm and said manipulator of said noise reducing element further comprises a first suction device associated with said first gripping member and able to be selectively activated to pick up, through said first gripping member, said noise reducing element from said second conveyor belt and release said noise reducing element onto said tyre.

27. The apparatus according to claim 26, wherein said first gripping member comprises a gripping surface having a curved profile, with a bending radius substantially equal to that of the radially inner surface of said tyre along a circumferential direction thereof.

28. The apparatus according to claim 27, wherein said gripping surface has an extension that is substantially equal to that of said noise reducing element.

29. The apparatus according to claim 23, further comprising a blade arranged between said first conveyor belt and said second conveyor belt and movable between a rest position distal from a plane to which the upper surface of said first conveyor belt belongs and an operative position in which said blade intersects said plane to which the upper surface of said first conveyor belt belongs.

30. The apparatus according to claim 21, further comprising a feeding belt arranged upstream of said first conveyor belt to feed said noise reducing element to said first conveyor belt.

31. The apparatus according to claim 30, wherein said distributor device comprises a second robotized arm movable between said feeding belt and said first conveyor belt to pick up said noise reducing element from said feeding belt and position it on said first conveyor belt.

32. The apparatus according to claim 31, wherein said distributor device comprises a second gripping member associated with a free end portion of said second robotized arm and a second suction device associated with said second gripping member and able to be selectively activated to pick up, through said second gripping member, said noise reducing element from said feeding belt and release said noise reducing element on said first conveyor belt.

33. The apparatus according to claim 21, further comprising an adjusting device for adjusting the position of said continuous film on the upper surface of said first conveyor belt in a direction perpendicular to said feeding direction.

34. The apparatus according to claim 21, further comprising a first guide rail for guiding said noise reducing element, said first guide rail being arranged on said first conveyor belt.

35. The apparatus according to claim 23, further comprising a second guide rail for guiding said noise reducing element, said second guide rail being arranged on said second conveyor belt.

36. The apparatus according to claim 23, further comprising:
- a first adjusting device for adjusting the advancing speed of said first conveyor belt; and
- a second adjusting device for adjusting the advancing speed of said second conveyor belt;
  wherein said first and second adjusting devices can be selectively activated independently from each other.

37. The apparatus according to claim 23, further comprising a thrusting member arranged close to a head end portion of said second conveyor belt and configured to exert on said noise reducing element a thrust having a component oriented upwards.

\* \* \* \* \*